(12) United States Patent
Matsumoto et al.

(10) Patent No.: US 7,312,885 B2
(45) Date of Patent: Dec. 25, 2007

(54) IMAGE COMMUNICATION APPARATUS

(75) Inventors: Koichi Matsumoto, Tokyo (JP);
Kazuto Yanagisawa, Ibaraki (JP);
Muneki Nakao, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1231 days.

(21) Appl. No.: 10/055,972

(22) Filed: Jan. 28, 2002

(65) Prior Publication Data
US 2002/0101623 A1    Aug. 1, 2002

(30) Foreign Application Priority Data
Jan. 29, 2001    (JP)  ............................. 2001-019598

(51) Int. Cl.
*G06K 1/00*    (2006.01)
(52) U.S. Cl. ................... 358/1.15; 358/1.13; 358/1.16
(58) Field of Classification Search ............... 358/440, 358/468, 437, 1.15, 1.14; 307/141; 340/426.28, 340/542, 5.31
See application file for complete search history.

(56) References Cited
U.S. PATENT DOCUMENTS
4,588,901 A * 5/1986 Maclay et al. .............. 307/141
4,718,107 A * 1/1988 Hayes .......................... 725/27
5,594,430 A * 1/1997 Cutter et al. ............... 340/5.22
5,822,123 A * 10/1998 Davis et al. .................. 725/43

FOREIGN PATENT DOCUMENTS
JP      7-15582      1/1995
JP      07-015582  * 1/1995

* cited by examiner

*Primary Examiner*—Kimberly A. Williams
(74) *Attorney, Agent, or Firm*—Fitzpatrick, Cella, Harper & Scinto

(57) ABSTRACT

An object of the present invention is to provide an image communication apparatus capable of preventing the useless use of not-cheaped BJ ink owing to the innocent behavior of an infant or the like, and capable of preventing the disturbance of the rhythm of a home life by a cat or the like. An image communication apparatus includes operation instructing means for instructing reading operation, image processing operation, image recording operation, calling operation and communication operation; and operation instruction disabling means for disabling an instruction of each operation by the operation instructing means.

4 Claims, 10 Drawing Sheets

IMAGE COMMUNICATION APPARATUS

BACKGROUND OF THE INVENTION

1. Field of the Invention

The present invention generally relates to image communication including facsimile communication, and more particularly to an image communication apparatus such as a facsimile machine equipped with a cordless subsidiary phone.

2. Related Background Art

In recent years, home facsimile machines have widely become popular as an image processing apparatus for home use that is equipped with a codeless hand scanner and a codeless subsidiary phone, has an answering machine function, and further is able to handle color images.

However, such conventional facsimile machines have too much functions such as a postcard copying function, a function for printing data obtained by a digital camera, and the like. Because the machines are installed in each general home as being indicated by their name of a "home facsimile machine", a problem such that the machines sometimes perform useless operation caused by unnecessary operations exists.

That is, a facsimile machine ordinarily includes an operation unit, and a user can operate the machine by pushing buttons provided in the operation unit. For example, the user can catch a communication line by pushing an off-hook button; the user can telephone by pushing a one-touch button or ten-key buttons; the user can perform reception records by pushing a start button; the user can call up a cordless subsidiary phone by pushing a subsidiary phone calling button; the user can ring a calling sound by pushing a calling volume adjusting button; and the user can perform the cleaning of a bubble jet (BJ) unit by pushing a cleaning button in a machine employing a BJ system in its recording unit.

When the aforesaid operations are operated by a user with a clear intention, the conventional facsimile machine is made in a very convenient state for the use.

However, when the user once operates the aforesaid operations without clear intention, the conventional facsimile machine has the problem such that bad influences caused by the useless operation increase. That is, for example, a communication line is uselessly connected, causing the communication line to be in a busy state. Also, by the ringing of a calling sound or the subsidiary phone calling-up a cordless subsidiary phone begins to be ringing, which is troublesome in the middle of the night. In the case where cleaning is thoughtlessly performed, BJ ink is rapidly exhausted, and the ink runs out when the user wants to use the BJ system.

Home facsimile machines to be installed in homes have problems such that, when children (especially infants) operate them, cleaning is thoughtlessly performed to exhaust BJ ink rapidly, and thereby the ink runs out when a user wants to use them. As a real matter, infants frequently repeat the same thing dozens of times until parents stop the thing because they never get tired of what they have been interested.

On the other hand, the home facsimile machines also have the following problem. That is, when a small animal (especially a cat or the like) operates a home facsimile machine, a communication line is uselessly connected to create a state of being busy, or a cordless subsidiary phone begins to ringing by the ringing of a calling sound or the subsidiary phone calling-up, which becomes very troublesome in the middle of the night or the like. Frequently, a cat or the like thoughtlessly walks on a facsimile machine in the middle of the night to make a call or to perform cleaning.

That is, conventional facsimile machines have a problem such that not-cheaped BJ ink is uselessly used, or a problem such that a cat or the like puts the rhythm of a home life out of order.

Such a problem is also produced in an image communication apparatus other than the facsimile machine such as a personal computer having an image communication function and the like.

SUMMARY OF THE INVENTION

One object of the present invention is to provide an image communication apparatus capable of preventing the aforesaid useless use of expensive BJ ink owing to the innocent behavior of an infant or the like, and capable of preventing the disturbance of the rhythm of a home life by a cat or the like.

For the achievement of the foregoing object, the present invention provides an image communication apparatus including a printing unit for printing an image by scanning a printing head discharging ink onto the recording medium, and an operation panel having operation keys for making the image communication apparatus perform a cleaning operation of the printing head by being operated. The apparatus includes: (1) cleaning means for performing a cleaning operation of the printing head by discharging ink according to an input by a key operation; (2) a key lock switch for prohibiting an input by operation of at least one of the operation keys, wherein it is prohibited to perform a cleaning operation of the print head, under the condition that the input by the key operation is prohibited by the key lock switch; (3) reset judging means for judging whether prohibition of the input by the key lock switch is reset or not; (4) timing means; (5) appointed time information storing means for storing appointed time information; and (6) appointed time judging means for judging whether an appointed time measured by the timing means has passed or not. When the appointed time judging means judges that the appointed time has passed under the condition that the input by the key operation is prohibited by the key lock switch, the reset judging means judges that the prohibition of the input by the key lock switch is reset and the input by the key operation is allowed so that the cleaning means can perform a cleaning operation of the printing head.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION OF THE PREFERRED EMBODIMENTS

First Embodiment

Figure 1:
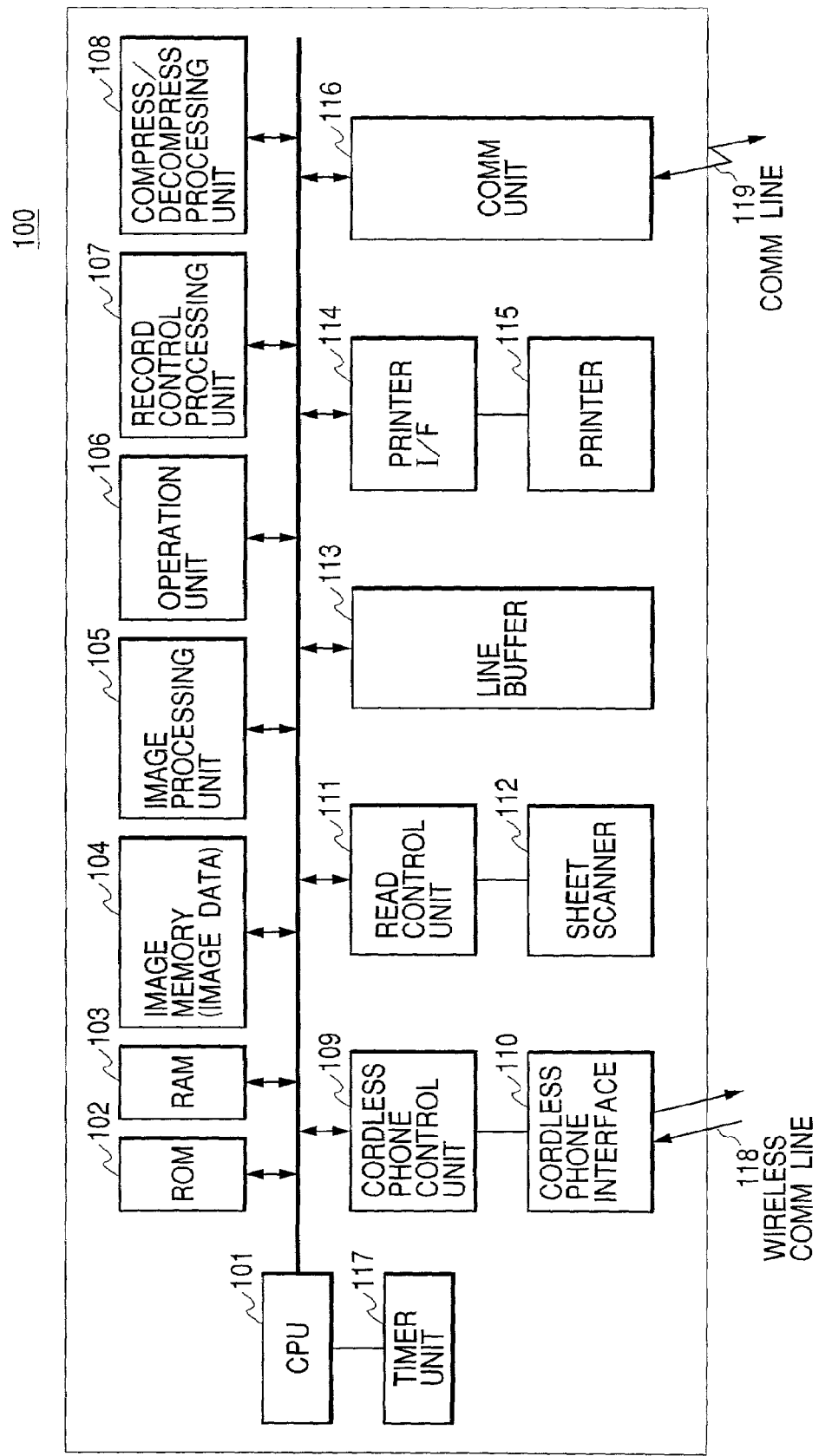
FIG. 1 is a block diagram showing an image processing apparatus of a first embodiment of the present invention.

FIG. 1 is a block diagram showing an image processing apparatus 100 of a first embodiment of the present invention.

In the image processing apparatus 100, a central processing unit (CPU) 101 is a system controlling unit for controlling the whole of the image processing apparatus 100. A read only memory (ROM) 102 is a memory for storing controlling programs of the CPU 101. A random access memory (RAM) 103 is composed of a static RAM (SRAM) or the like for storing program control variables and the like, and the RAM 103 is a memory for storing values set by an operator, the management data of the apparatus 100 and the like besides the program control variables. An image memory 104 is composed of a dynamic RAM (DRAM) or the like, and is a memory for storing image data.

An image processing unit 105 performs edge enhancement, brightness/density conversion, multilevel/binary conversion and the like. An operation unit 106 is composed of a keyboard or the like for the various input operations of the operator. A record control processing unit 107 converts binary information to native commands for recording. A compress/decompress processing unit 108 converts image data by the modified Huffman (MH) coding, the modified READ (MR) coding, or the like.

A subsidiary phone (or cordless phone) control unit 109 performs the control of a cordless phone interface unit 110 by a wireless communication line 118, and performs the control of the transmission and the reception of information between the image processing apparatus 100 and a subsidiary phone (or cordless phone). A sheet scanner 112 is composed of a contact image sensor (CS) or a charge coupled device (CCD) image sensor, an original conveying mechanism and the like. The sheet scanner 112 reads an original optically to convert the read image to electric image data. The image data receives their gamma processing and positional correction processing by a read control unit 111 to be outputted as highly precise image data.

A line buffer 113 is a buffer to be used in the case where image data are controlled to be transmitted. A printer 115 is a BJ printer for recording a received image or file data on plain paper. A printer interface unit 114 converts file data from a personal computer to a printer description language at the time of the performance of the printing of the file data. A communication unit 116 is composed of a modem, a network controlling unit or the like for communicating with other telecommunication equipment. A timer unit 117 for measuring operation intervals and the like is composed of a clock integrated circuit (IC) or the like.

Figure 2:
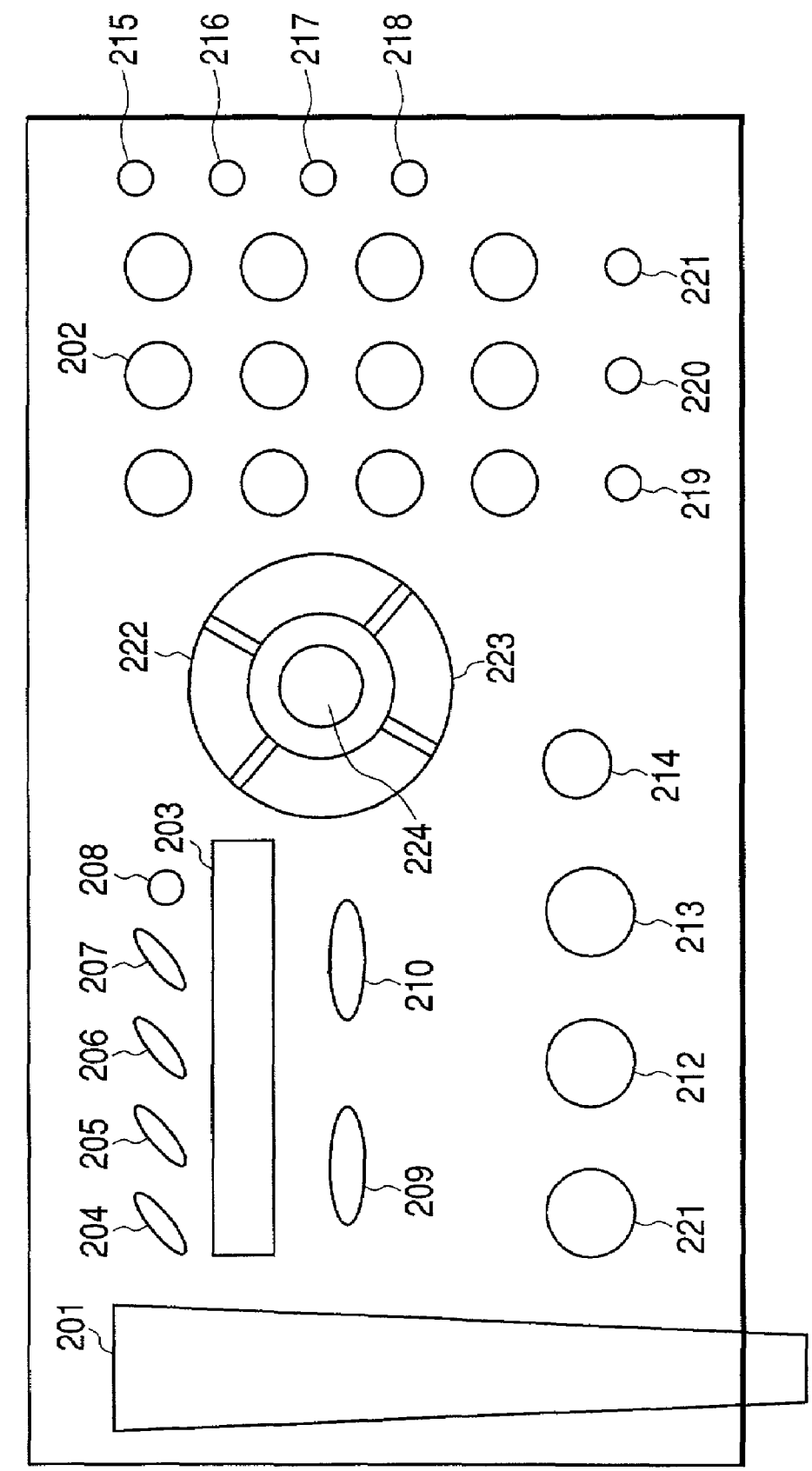
FIG. 2 is a block diagram showing an operation unit in the aforesaid embodiment.

FIG. 2 is a block diagram showing the operation unit 106 in the aforesaid embodiment.

The operation unit 106 includes a handset 201 for performing speech communication with the opposite party, a ten key 202 for dialing to the opposite party, a display unit 203 for urging various operations and displaying error (or caution) information, a function mode key 204 for instructing various kinds of resister operation and test operation, recording, reproducing and erasing keys 205 to 208 for answer/record operation, an α5-indicating lamp 208 for the information of the operation of a least cost routing (LCR) function, a switching key 209 for switching image processing between color processing and monochrome processing, and an image quality key 210 for setting the image qualities of copying images, communication images and the like.

Moreover, the operation unit 106 includes a facsimile transmission start key 211 for starting transmission of image information to the opposite party, a reception printing start key 212 for starting reception/printing of image information received in the image memory 104, a copying start key 213 for starting copying, a stopping key 214 for stopping various kinds of operations, a cordless phone (or subsidiary phone) calling key 215 for calling a cordless phone (or subsidiary phone), and a holding key 216. The holding key 216 is a sleep mode key for setting the image processing apparatus 100 at an absence mode or disabling all of the other operations of the operation unit 106. The holding key 216 also functions as a key for making the opposite party wait while speaking.

Furthermore, the operation unit 106 includes a redial key for redialing a telephone number to which dialing was performed at the preceding time or a pause key 217 for making an exchange wait temporarily at a time of calling, an arrival history key for informing the calling information of the opposite parties (e.g. telephone numbers) on the aforesaid display unit 203 in order or a call waiting key 218 for receiving a call from a third party during speaking, a speaker phone key 219 for catching a communication line in a loudspeaker mode, a voice dial key 220 for calling an opposite party with voice, an absence key 221 for switching to the setting of the answering machine function, a calling sound increasing key 222 for increasing a calling sound, a calling sound decreasing key 223 for decreasing the calling sound, and a setting key 224 for determining each information at the time of various registering operations.

Next, the operation of the embodiment is described.

Figure 3:
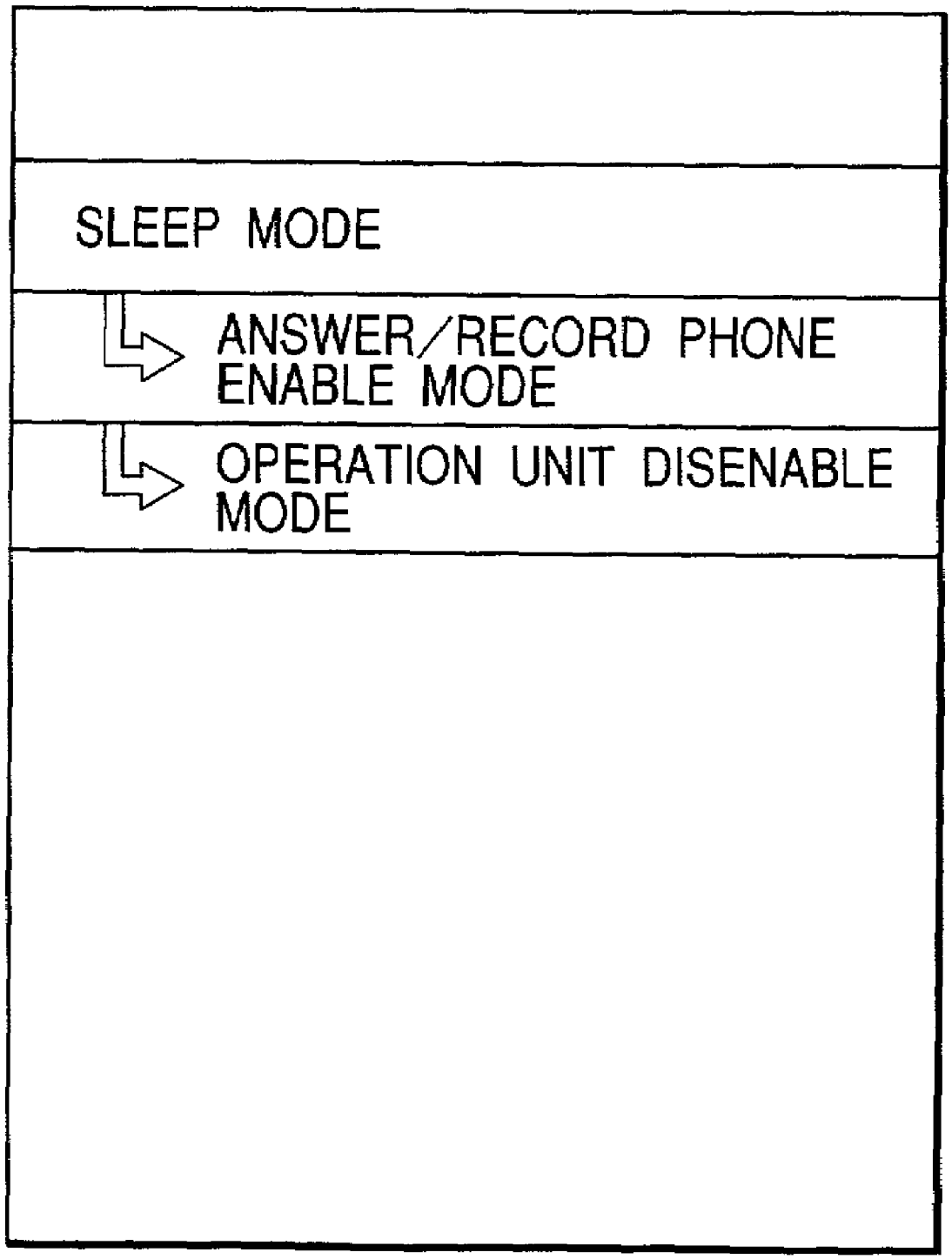
FIG. 3 is a memory configuration diagram showing a setting state in the inside of a memory region in a sleep mode of the aforesaid embodiment.

FIG. 3 is a memory configuration diagram showing a setting state in a memory area at the sleep mode in the aforesaid embodiment.

Figure 4:
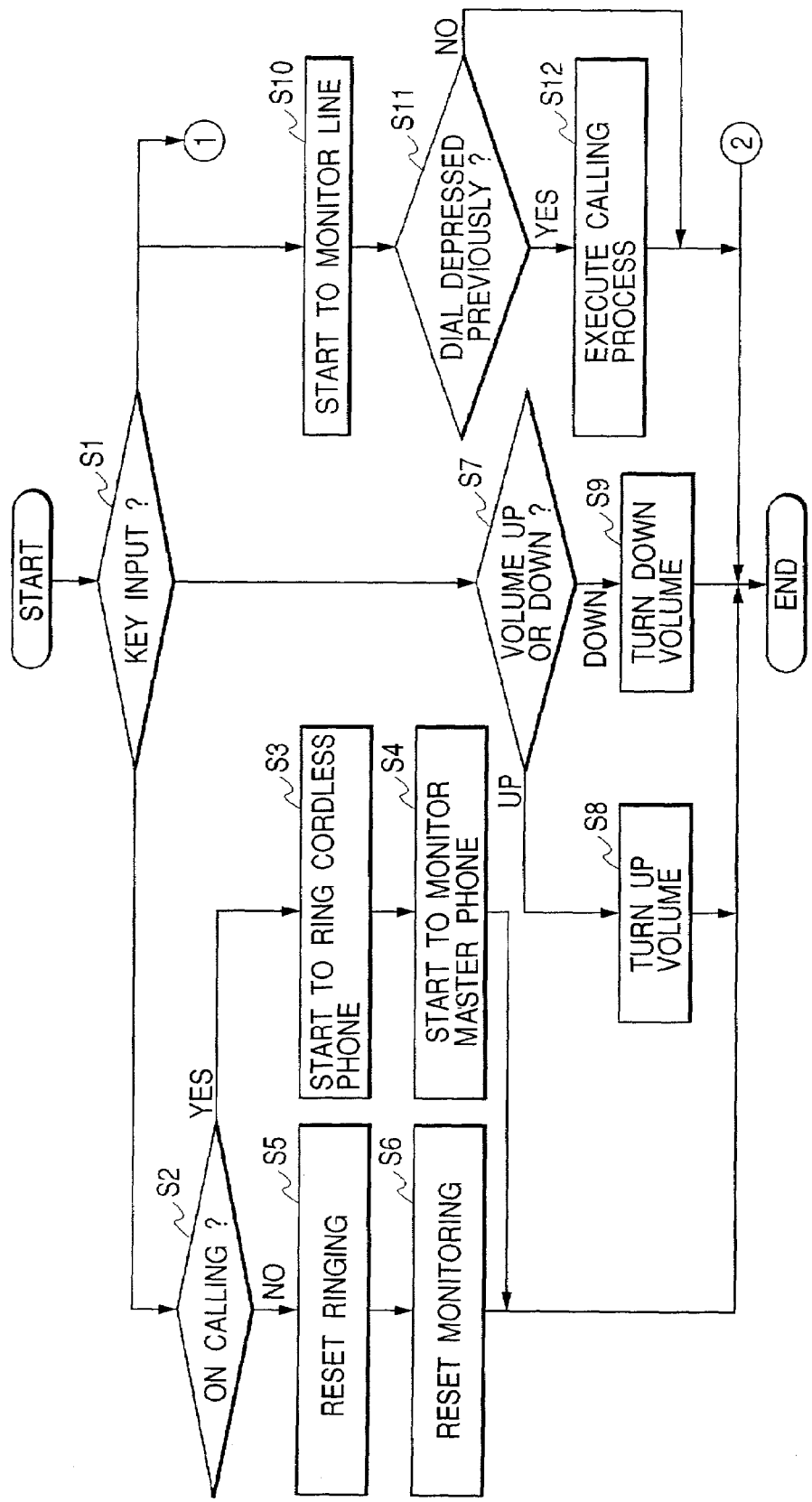
FIG. 4 is a flow chart showing the operation concerning a part of key input at the operation unit in the aforesaid embodiment.

FIG. 4 is a flow chart showing the operation concerning key input by a part of the operation unit 106 in the aforesaid embodiment.

When key input is performed (Step S1), various kinds of operations are performed correspondingly to the input key. When the cordless phone calling key 215 is depressed, the judgment concerning whether calling is now being performed or not is performed (Step S2). When the calling is not being performed now, a cordless phone connected to the image processing apparatus 100 wirelessly is called up by ringing the cordless phone through the cordless phone control unit 109 and the cordless phone interface unit 110 (Step S3). At this time, a main phone (or master phone) begins monitoring the cordless phone (Step S4), and the main phone waits a response from the cordless phone. Moreover, when calling is stopped because calling has already been performed and no cordless phone has responded to the calling, the cordless phone calling key 215 is also depressed to inform the cordless phone of stopping the calling thereof through the cordless phone control unit 109 and the cordless phone interface unit 110, and thereby the calling is stopped. At this time, the monitoring of the cordless phone by the main phone is also reset (Step S6).

When the calling sound increasing key 222 or the calling sound decreasing key 223 is depressed (Step S7); namely, when the calling sound increasing key 222 is depressed, the volume of the calling sound is turned up and the calling sound is once rung (Step S8); and when the calling sound decreasing key 223 is depressed, the volume of the calling sound is turned down and the calling sound is once rung (Step S9).

When the speaker phone key 219 for the loudspeaker mode is depressed, the monitoring of a communication line is started (Step S10). Then, whether or not the dial has already been depressed with the ten key 202 or the like is judged (Step S11), and when the dial has already been depressed, the calling process of the communication line is executed (Step S12). Moreover, even when a setting key used in setting various modes is depressed, in the case where a dial has already been depressed with the ten key 202 or the like, the monitoring of the communication line is begun and the calling process is executed.

As described above, when some keys are depressed, the main phone or the cordless phone outputs a sound.

Accordingly, the aforesaid embodiment stops the aforesaid operation by the depression of the sleep mode key 216.

At first, in the sleep mode, as shown in FIG. 3, there are two modes. That is, there is a mode in which the absence mode is set and when a signal from the opposite party arrived, if the signal is a voice, an answering recording machine is set to be enabled, and if the signal is a facsimile signal, the facsimile signal is automatically received to be automatically processed without any operation of the arrival side. In addition to the mode, there is another mode for disabling all of the operations in the operation unit 106 (hereinafter this mode is referred to as an "operation unit disable mode").

Figure 5:
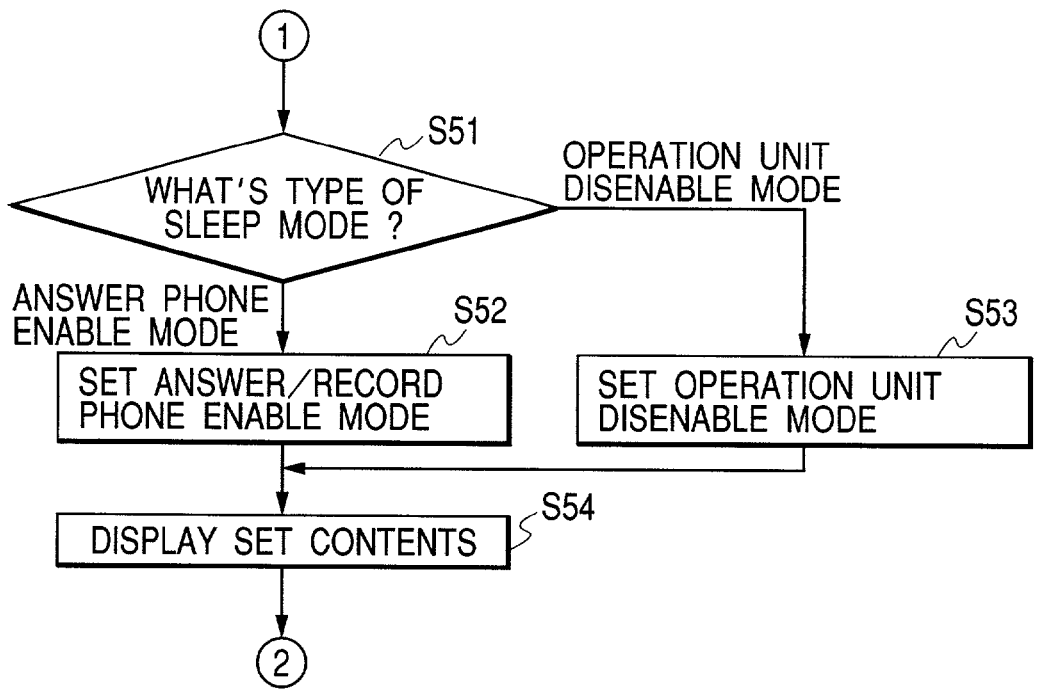
FIG. 5 is a flow chart showing the operation concerning key input by a part of the operation unit in the aforesaid embodiment.

FIG. 5 is a flow chart showing the operation concerning key input of a part of the operation unit 106 in the aforesaid embodiment.

When the sleep mode key 216 is depressed, what is a current type of the present sleep mode is judged (Step S51). In case of setting a mode, the absence mode is set (Step S52). In case of the operation unit disable mode, the absence mode is set and the operations in the operation unit 106 after that are disabled (Step S53). Then, the fact that the operation unit disable mode is set is displayed on the display units 203 of the main phone and the cordless phone (Step S54).

Incidentally, the operation unit disable mode is a mode for disabling the instructions of the operation instructing means concerning each of reading operation, image processing operation, image recording operation, calling operation and communication operation.

Next, the reset operation of the sleep mode in the aforesaid embodiment is described.

Figure 6:
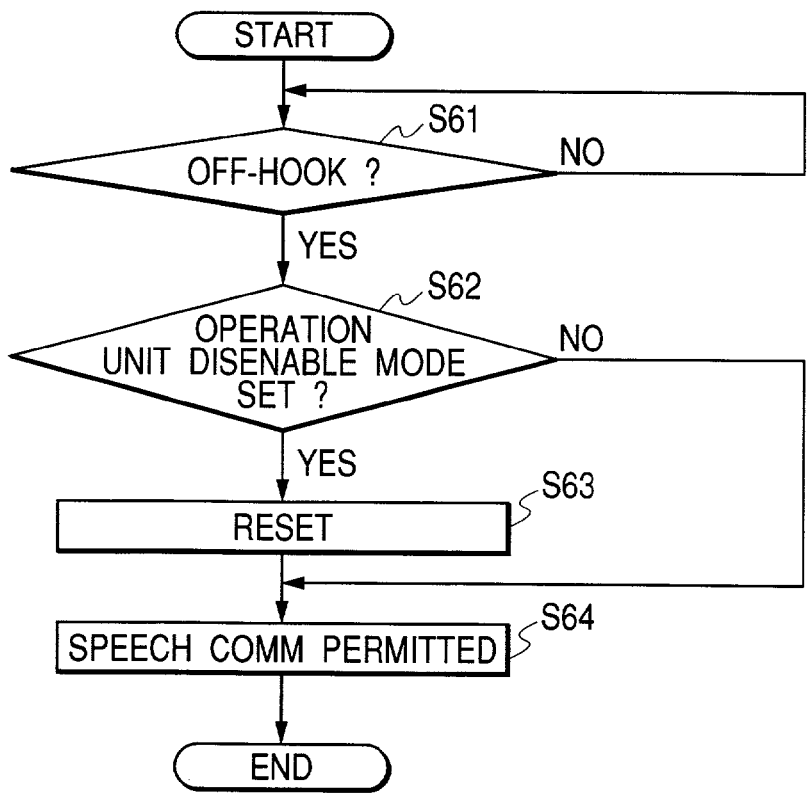
FIG. 6 is a flow chart showing the reset operation of the sleeping mode in the aforesaid embodiment.

FIG. 6 is a flow chart showing the reset operation of the sleeping mode in the aforesaid embodiment.

When the sleep mode is set as the absence mode, the sleep mode can be reset by another depression of the holding key 216. However, when the sleep mode is set as the operation unit disable mode, the sleep mode key 216 is also disabled. In this case, the handset 201 of the main phone is lifted to enter in the off-hook state (Step S61). Thereby, when the sleep mode is set as the operation unit disable mode (Step S62), both of the absence mode and the operation unit disable mode are reset (Step S63), and the speech communication is permitted (Step S64).

In the aforesaid embodiment, the setting of the absence mode and the setting of the operation unit disable mode are performed in the sleep mode, and the setting of the operation unit disable mode includes the absence mode, but they may be performed separately. That is, the setting of the operation unit disable mode may be performed independently from the absence mode.

Moreover, when the operation unit disable mode is reset by means of the cordless phone, the operation unit disable mode may be reset not only by the use of the off-hook signal but also by the use of a signal other than the off-hook signal.

Furthermore, the operation unit disable mode may be reset by a method of changing the depressed state such as the depressing of the sleep mode key 216 for a long period.

According to the aforesaid embodiment, even if the chances of such image processing apparatus as used in homes increase in the home market in which the spread thereof is further enlarged, the apparatus according to the present invention does not cause the operation that disturbs the rhythm of a life such as the bad influence caused by the depressing operation of each button in the operation unit 106 by a cat or the like in the middle of the night. Moreover, the apparatus can prevent the use of not-cheaped BJ ink owing to the innocent behaviour of an infant. Consequently, the apparatus does not cause the dissatisfaction after the purchase thereof.

Incidentally, the ROM 102, the CPU 101 and the operation unit 106 comprise an example of the operation instructing means for instructing reading operation, image processing operation, image recording operation, calling operation and communication operation. Moreover, they also comprise an example of the operation instruction disabling means for disabling the instruction of each of the aforesaid operation by the operation instructing means.

Incidentally, a conventional facsimile apparatus capable of preventing mistaken operations by being equipped with a key lock function has become more functional but more complicated, and consequently the facsimile apparatus has a problem such that, when an operator pushes a mistaken key, an unintentional function is set and unexpected operation such as the rewriting of registered data and software switches or the like happens.

For example, when a switching key of a reception mode is carelessly pushed, the automatic reception state is changed to the manual reception state to make it impossible to receive automatically a signal.

In the conventional art, such imprudent switching is escaped by providing a data protect switch for switching the states of capability of data registering to thereby protect registered data by hardware, or by providing a switch for fixing the setting of functions themselves by hardware in place of a method of scanning key inputs by software.

Moreover, another conventional art performs the prohibition of calling by software by means of key locking using a password with an object of security, although the object of the conventional art is different from that of the former relate art. An invention concerning the prohibition of key operations by means of hardware with the same object of security is disclosed in Japanese Patent Application Laid-Open No. 7-15582.

The related art using the switching by hardware among the related art mentioned above requires to have switches as much as the number of functions for preventing their mistaken operations. Moreover, the related art has a problem such that the switching by hardware is not suitable for enabling a user to customize the assignment of functions to keys (namely, being program keys).

Moreover, among the related art mentioned above, there can be a pure software technique for preventing the switching of the states of an apparatus by one action by architecting the hierarchy of the software switches to be deep. However, the technique has a problem such that the architecting becomes a primary factor making the operability of the apparatus worse. That is, there is such a problem that a system in which the keys and the functions correspond to each another in order that an operator can instantly recognize the functions is superior in operability and the technique making the hierarchy deep by means of soft keys is inferior in operability.

Such a problem is also produced in an image communication apparatus other than the facsimile machine such as a personal computer having an image communication function and the like.

The present invention aims to provide an image communication apparatus capable of preventing mistaken operations without sacrificing the operability thereof.

Second Embodiment

Figure 7:
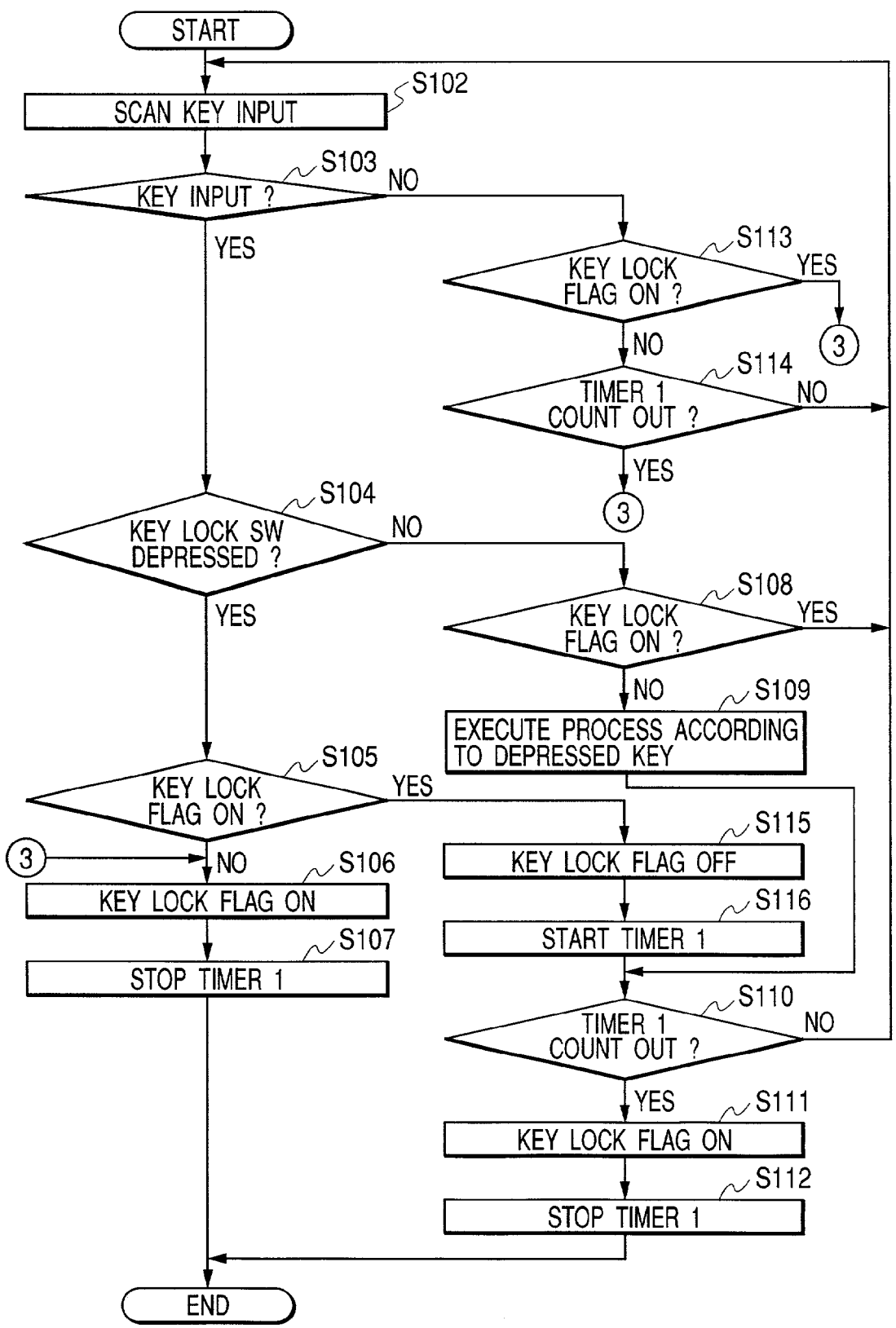
FIG. 7 is a flow chart showing the operation of a second embodiment of the present invention.

FIG. 7 is a flow chart showing the operation of a second embodiment of the present invention.

Incidentally, the hardware realizing the second embodiment and the following ones is the same as that of the image processing apparatus 100 shown in FIG. 1.

The second embodiment uses a tact key, which does not hold a fixing position as hardware, as a key lock switch. Hereupon, the key lock switch is a switch that turns on when operation keys are locked and turns off when the operation keys are made to be a reset state. A timer 1 is a timer that automatically enters into a key lock state after a predetermined time after the reset of the key lock.

At Step S102 and Step S103, a key input is scanned. At Step S104, it is judged whether the inputted key is a key lock switch or not, and when the key lock switch is depressed, the system advances to Step S105.

When no key input exists at Step S103, the system goes to Step S113. At Step S113, it is examined whether the system is in a key lock state. When the system is in the key lock state, the system leaps to Step S106.

At Step S105, it is examined whether a key lock flag (or a flag indicating whether the operation keys are locked or reset) is ON or not. When the key lock flag is not ON (or a state in which the keys are locked), the system advances to Step S106.

At Step S106, the system resets the state thereof at the key lock state. At Step S107, the system stops the counting of the timer 1 and ends the operation.

When a switch other than the key lock switch is depressed at Step S104, the system advances to Step S108. At Step S108, the system examines whether the key lock flag is ON or not. When the system is in the key lock state, the system ignores the input key and returns to Step S102. Then, the system performs the next key scanning.

When the key lock flag is ON at Step S105, the system moves to Step S115. After the key lock flag is set to OFF, the system advances to Step S116.

At Step S114, the system starts the counting operation of the timer 1, and then the system moves to Step S110.

At Step S110, the system checks the timer 1. When the counter does not reach a full state (or has not counted out), the system returns to Step S102, and waits the next key input.

When the key lock flag is OFF (the key lock has been reset) at Step S108, the system advances to Step S109. The system performs a predetermined operation according to the input key, and then the system advances to Step S110.

When the timer 1 has not counted out at Step S110, the system returns to Step S102, and waits the next key input.

When the timer 1 has counted out at Step S110, the system turns a key lock flag 2 on (sets the flag 2 at the key lock state) at Step Sill, and the system stops the timer 1 and ends the operation at Step S112.

That is, the second embodiment employs the key lock switch, and consequently, key operations needs actions, which enables the prevention of careless mistaken operations.

Third Embodiment

Figure 8:
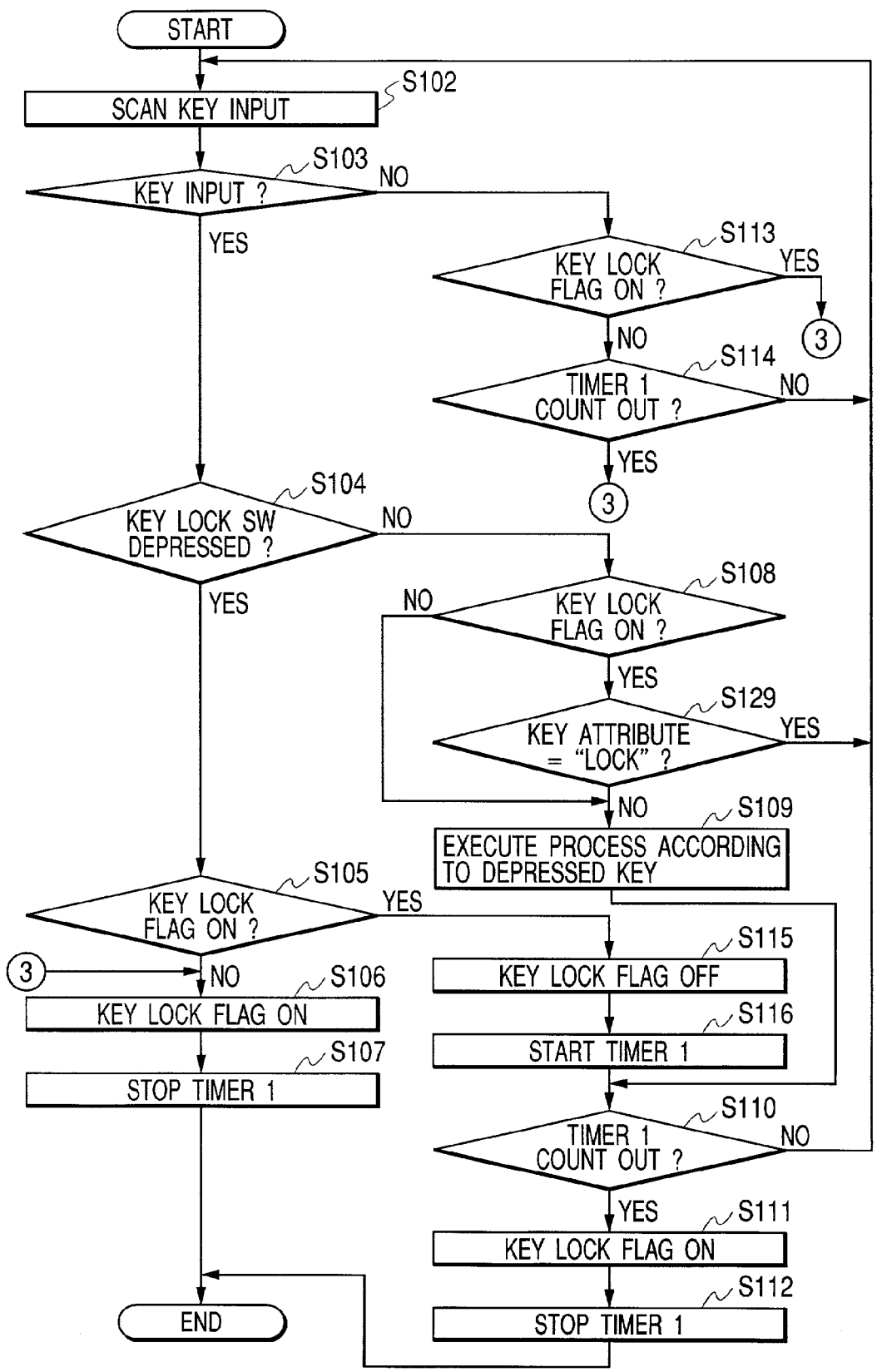
FIG. 8 is a flow chart showing the operation of a third embodiment of the present invention.

FIG. 8 is a flow chart showing the operation of a third embodiment of the present invention.

In the third embodiment, a judging step (Step S129) at which it is judged whether a key attribute is "locked" or not is added.

That is, the third embodiment is made to be able to appoint whether a key is locked or not in the case where the system is set at the key lock state with the key lock switch. When the AND condition of the key lock switch and the key attribute is satisfied, the corresponding operation key is locked.

When an attribute is registered to an operation key, the system may be configured such that an operator can operates the registration, and the system may also be configured to give the attribute to only a specific key of the apparatus. In this case, the operator cannot set the attribute.

That is, according to the third embodiment, all of the operation keys are not locked with the key lock switch, but only the operation key that is used in less frequency is locked. Consequently, the third embodiment can prevent mistaken operations without scarifying the operability thereof.

That is, according to the third embodiment, the key lock switch does not lock all of the operation keys, but only the operation key that is seldom used is locked. Consequently, the third embodiment can prevent mistaken operations without any scarification on the aspect of the operability thereof.

Fourth Embodiment

Figure 9:
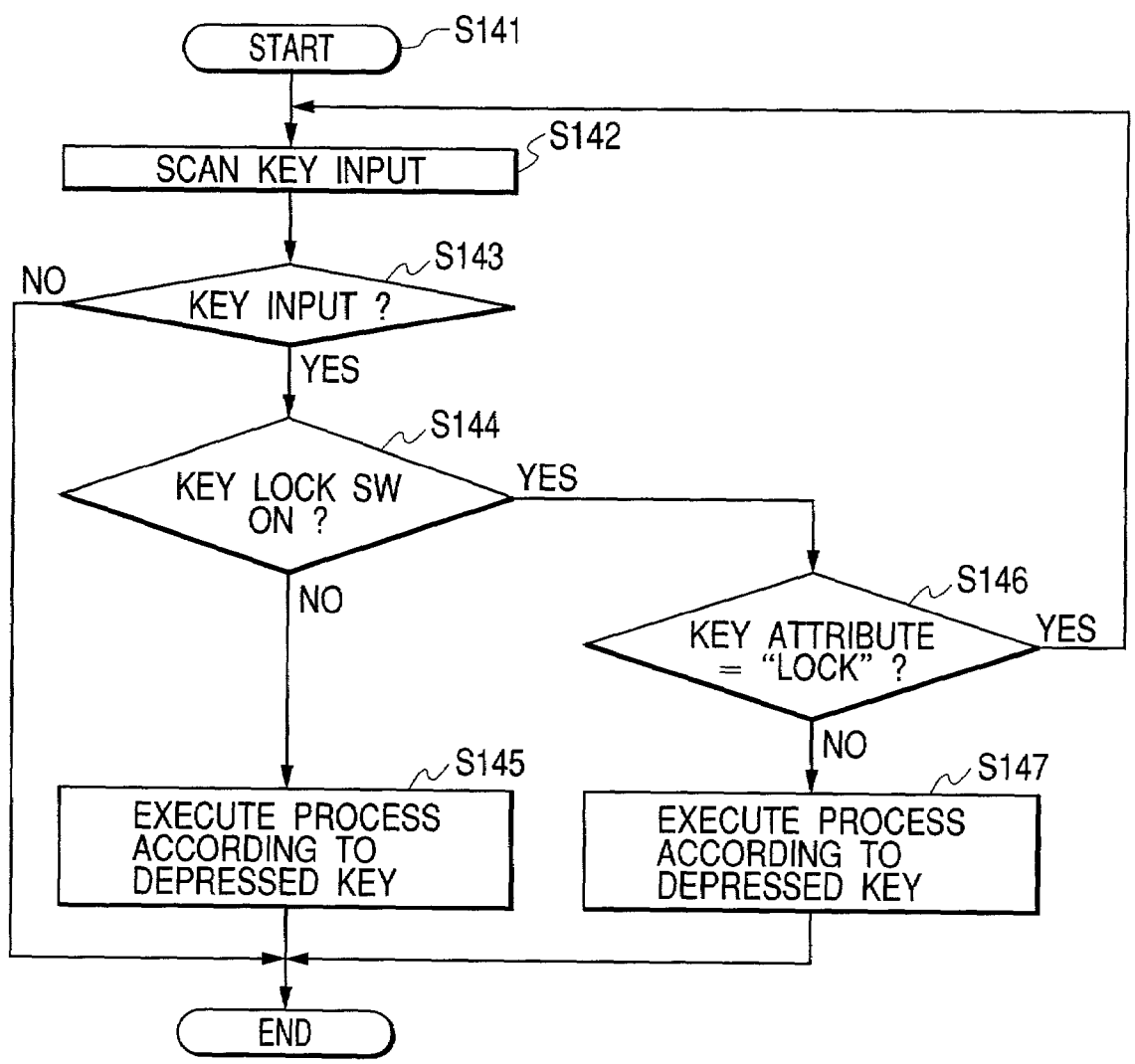
FIG. 9 is a flow chart showing the operation of a fourth embodiment of the present invention.

FIG. 9 is a flow chart showing the operation of a fourth embodiment of the present invention.

The fourth embodiment constitutes the key lock switch by means of a switch that can hold a fixing position as hardware in the second and the third embodiment.

That is, according to the fourth embodiment, an operator can customize an operation key to be key-locked, and the fourth embodiment can further improve the operability thereof according to the demand of the operator and can prevent mistaken operations.

Fifth Embodiment

Figure 10:
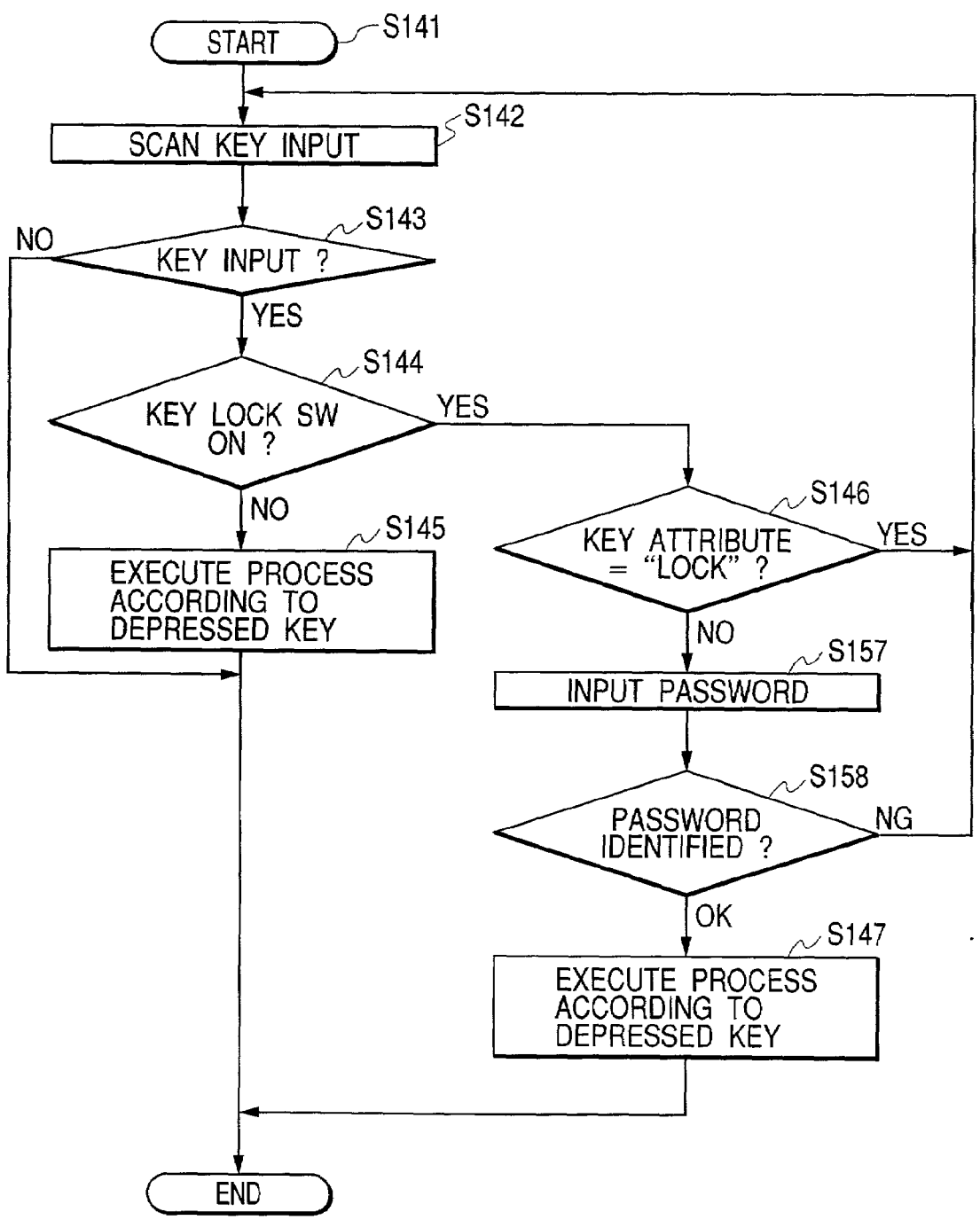
FIG. 10 is a flow chart showing the operation of a fifth embodiment of the present invention.

FIG. 10 is a flow chart showing the operation of a fifth embodiment of the present invention.

The fifth embodiment combines a password with the fourth embodiment (Steps S157 and S158).

In FIG. 10, the identification of a password added at Steps S157 and S158 makes the system accept a predetermined operation only when the password is identified.

For the simplification of descriptions, the fifth embodiment combines the password to the fourth embodiment, but the password may be combined with the second embodiment or the third embodiment.

That is, according to the fifth embodiment, a personal identification password can be combined to divert the system for the object of security (or the limitation of a user).

Sixth Embodiment

Figure 11:
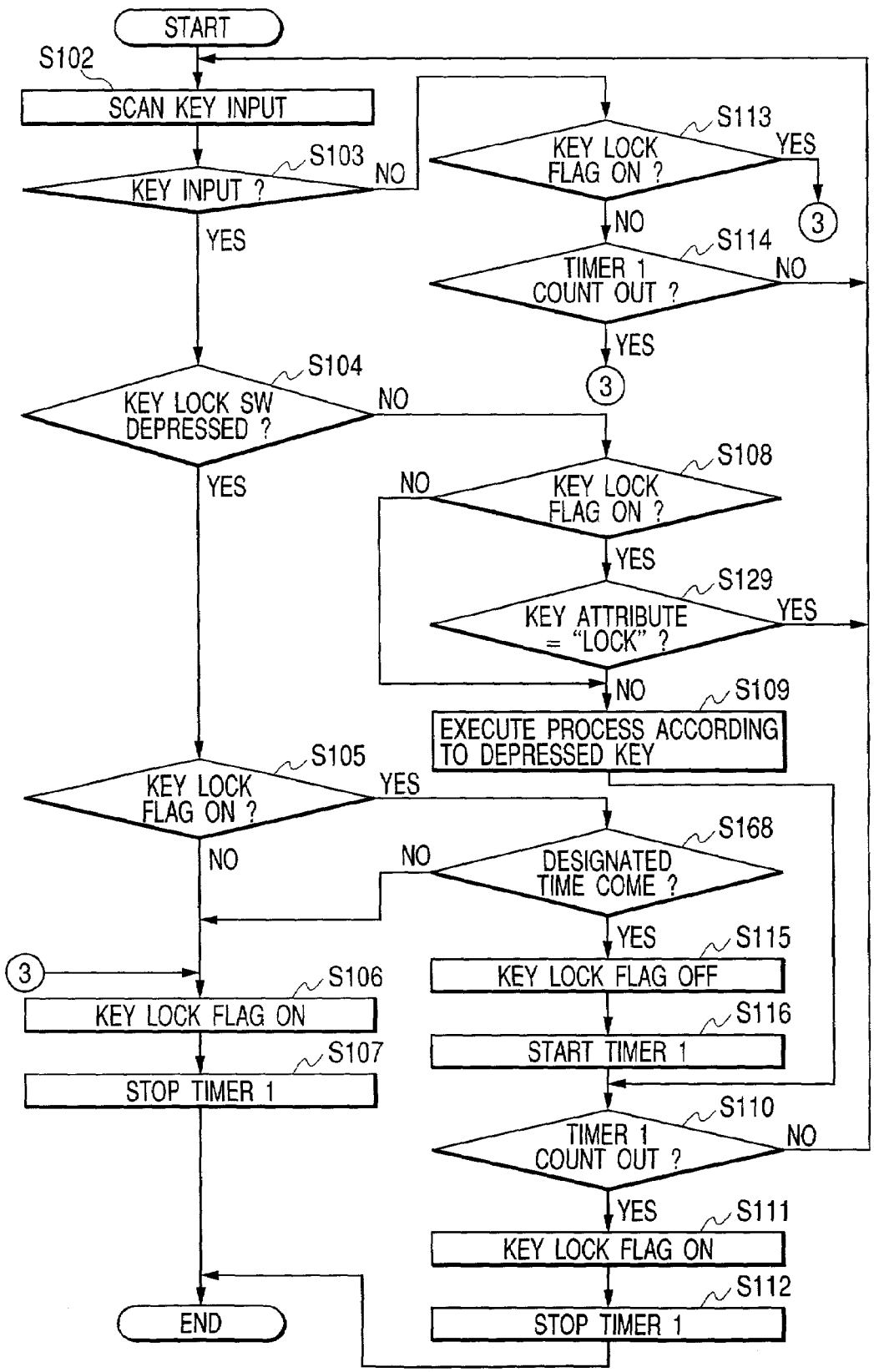
FIG. 11 is a flow chart showing the operation of a sixth embodiment of the present invention.

FIG. 11 is a flow chart showing the operation of a sixth embodiment of the present invention.

The sixth embodiment combines the identification of time with the second embodiment or the third embodiment. The sixth embodiment accepts predetermined operation only at an appointed time by adding the step of identification of time (Step S168) when the key lock switch is reset.

That is, according to the sixth embodiment, the limitation of a user by means of an appointed time can be realized by combining the timer function with the other embodiment.

Incidentally, each embodiment described above may be applied to an image communication apparatus other than the facsimile machine such as a personal computer with an image communication function.

According to the inventions of claims 1 to 5, the inventions bring about effects such that the disturbance of the rhythm of a home life by a cat or the like can be prevented and the useless use of not-cheaped BJ ink owing to the innocent behavior of an infant or the like can be prevented.

According to the inventions of claims 6 to 11, the inventions bring about effects such that the mistaken operations of an image communication apparatus can be prevented without any sacrifice of the operability thereof.

Although the invention has been described in its preferred form with a certain degree of particularity, obviously many changes and variations are possible therein. It is therefore to be understood that the present invention may be practiced than as specifically described herein without departing from the scope and the sprit thereof.

What is claimed is:

1. An image communication apparatus including a printing unit for printing an image by scanning a printing head discharging ink onto the recording medium, and an operation panel having operation keys for making said image communication apparatus perform a cleaning operation of said printing head by being operated, said apparatus comprising:

cleaning means for performing a cleaning operation of said printing head by discharging ink according to an input by a key operation;

a key lock switch for prohibiting an input by operation of at least one of said operation keys, wherein it is prohibited to perform a cleaning operation of said print head, under the condition that the input by the key operation is prohibited by said key lock switch;

reset judging means for judging whether prohibition of the input by said key lock switch is reset or not;

timing means;

appointed time information storing means for storing appointed time information; and appointed time judging means for judging whether an appointed time measured by said timing means has passed or not, wherein when said appointed time judging means judges that the appointed time has passed under the condition that the input by the key operation is prohibited by said key lock switch, said reset judging means judges that the prohibition of the input by said key lock switch is reset and the input by the key operation is allowed so that said cleaning means can perform a cleaning operation of said printing head.

2. An image communication apparatus according to claim 1, further comprising:

attribute storing means for storing an attribute indicating whether the prohibition of the input by said key lock switch is performed or not as to each of said operation keys; and comparing means for comparing the attribute of a key and a setting of said key lock switch.

3. An image communication apparatus according to claim 2, wherein the attribute is stored in said image communication apparatus by a setting of an operator.

4. An image communication apparatus according to claim 1, further comprising:

password storing means for storing a password;

password inputting means for inputting a password; and password checking means for checking the password inputted by said password inputting means against the password stored in said password storing means.

* * * * *

UNITED STATES PATENT AND TRADEMARK OFFICE
CERTIFICATE OF CORRECTION

| | | |
|---|---|---|
| PATENT NO. | : 7,312,885 B2 | Page 1 of 1 |
| APPLICATION NO. | : 10/055972 | |
| DATED | : December 25, 2007 | |
| INVENTOR(S) | : Koichi Matsumoto et al. | |

It is certified that error appears in the above-identified patent and that said Letters Patent is hereby corrected as shown below:

ON THE TITLE PAGE, ITEM (56) REFERENCES CITED:

Foreign Patent Documents, "JP    07-015582    *    1/1995" should be deleted.

COLUMN 8:

Line 13, "Sill," should read --S111,--.

Signed and Sealed this

Seventeenth Day of February, 2009

JOHN DOLL
*Acting Director of the United States Patent and Trademark Office*